United States Patent Office 2,971,819
Patented Feb. 14, 1961

2,971,819
PROCESS FOR IMPROVING THE QUALITY OF SULFURIC ACID

Marvin S. Antelman, University City, Mo., assignor to Monsanto Chemical Company, St. Louis, Mo., a corporation of Delaware No Drawing. Filed Jan. 10, 1958, Ser. No. 708,062

2 Claims. (Cl. 23—172)

This invention relates to improving the quality of sulfuric acid. More particularly this invention relates to improving the quality of sulfuric acid containing nitrogen-oxygen compound impurities by treating same with acetylene.

Sulfuric acid solutions such as spent nitrating acid, the residual sulfuric acid of a nitric acid concentrating and drying operation, and Glover tower acids contain relatively small amounts of nitrogen-oxygen compound impurities, which impurities are highly objectionable in many operations requiring sulfuric acid. These nitrogen-oxygen compound impurities are generally understood in the art to be in the form of nitric acid as such or as nitrosyl sulfuric acid, and while many methods have been proposed for their removal not one has been found entirely satisfactory from the standpoint of economics or efficiency or ease of operation or any combination thereof.

In accordance with this invention it has been found that the quality of sulfuric acid containing nitrogen-oxygen compound impurities can be improved in an economic, efficient and convenient manner by the treatment of said impure acid with acetylene. In the process of this invention acetylene effects removal of nitrogen-oxygen compound impurities in any form which may contaminate sulfuric acid. It is not known with certainty in what form the nitrogen-oxygen impurities exist in the various commercial sulfuric acid solutions, however, it is the opinion of those skilled in the art that in the cases of Glover tower acids and spent nitrating acids the nitrogen-oxygen impurity is present as nitrosyl sulfuric acid. With respect to residual sulfuric acid solutions of nitric acid drying and concentrating operations it appears the nitrogen-oxygen impurity is present as nitric acid. Assuming the nitrogen-oxygen impurities are fairly represented by nitric acid and/or nitrosyl sulfuric acid the reaction mechanism of the process of this invention may be represented as follows:

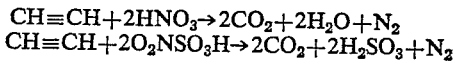

$$CH\equiv CH + 2HNO_3 \rightarrow 2CO_2 + 2H_2O + N_2$$
$$CH\equiv CH + 2O_2NSO_3H \rightarrow 2CO_2 + 2H_2SO_3 + N_2$$

However, despite the foregoing beliefs and theoretical possibilities as to the actual reaction mechanism, it is to be understood that the process of this invention includes purification of sulfuric acid solutions containing any amount of nitrogen-oxygen compound impurities in whatever form such impurities may be when present in and contaminating sulfuric acid solutions.

In the practice of this invention the impure sulfuric acid is treated with acetylene, that is acetylene is incorporated in the body of the acid, as for example, by passing the gas through the impure acid. While it is preferable to introduce acetylene per se to the impure acid it is to be understood that the process of this invention is not so limited in that materials such as the metallic carbides and acetylides, e.g., calcium carbide, sodium carbide, magnesium carbide, barium carbide, and the like, which are capable of generating acetylene on contact with the sulfuric acid solution to be purified can be added as such to the acid thereby forming acetylene in situ. The temperature at which acetylene is employed in treating the impure sulfuric acid is preferably in the range of about 20° C. to about 125° C., however, higher or lower temperatures can be employed.

The amount of acetylene required to remove the nitrogen-oxygen compound impurities is dependent upon a number of factors, all of which are subject to wide variation, namely (1) the temperature of the purification operation, (2) the amount of nitrogen-oxygen compound impurity, (3) the time interval permitted for completion of the purification, and (4) the type of sulfuric acid solution to be purified. In general, other factors being equal, the higher the operating temperature the lower the amount of acetylene required. Other factors being equal, the larger the amount of nitrogen-oxygen contaminant in a given sulfuric acid the larger the amount of acetylene is required. Additionally the shorter the permissible time interval within which it is desired to complete the purification the more acetylene is needed. On the other hand wherein time is no great importance the quantity of acetylene needed is lessened. In view of these variable conditions, each of which effects all of the others in one way or another, it is not possible to state the amount of acetylene to be used in all situations. However, the quantity of acetylene to be employed under any given set of conditions can be readily determined. For example, knowing the $H_2SO_4$ concentration and the quantity of nitrogen-oxygen compound impurity of a particularly sulfuric acid solution and realizing the temperature at which it is desired to conduct the purification and the time permitted, the quantity of acetylene needed in the plant operation is readily determined by treating one or more samples of the particular sulfuric acid solution with acetylene at the projected operating temperature and noting the amount of acetylene required to accomplish the desired degree of purification within the specified time interval. However, in general, for each part by weight of nitrogen-oxygen compound impurity calculated as nitric acid the quantity of acetylene required will be in the range of about 2 to about 500 parts by weight.

As illustrative of the process of this invention is the following:

*Example I*

To a suitable vessel is charged approximately 182 parts by weight of 98% sulfuric acid containing 0.0063% by weight nitrogen-oxygen compound calculated as nitric acid. The mass is heated to 60° C. and over a two minute period approximately 0.64 parts by weight of acetylene is passed through the so heated mass. After standing at room temperature for 48 hours the mass is analyzed and found to be completely free of nitrogen-oxygen compound impurities.

*Example II*

To a suitable vessel is charged approximately 182 parts by weight of 93% sulfuric acid containing 0.0007% nitrogen-oxygen compound calculated as nitric acid. The mass is heated at 25–30° C. and approximately 0.21 parts by weight of acetylene is passed through the so heated mass over a period of 4 minutes. After standing at room temperature for 72 hours the mass is analyzed and found to be completely free of nitrogen-oxygen compound impurities.

*Example III*

To a suitable vessel is charged approximately 182 parts by weight of 93% sulfuric acid containing 0.0007% nitrogen-oxygen compound calculated as nitric acid. To the mass at about 25° C. is added 0.036 grams of calcium carbide. After standing at room temperature for 24 hours, the mass is analyzed and found to be completely free of nitrogen-oxygen compound impurities.

In the process of this invention acetylene per se is preferably used and is incorporated in the body of the impure sulfuric acid in any fashion which permits good mixing, e.g., by sparging, and at any rate which satisfies the design and ends of the operator.

The process of this invention is particularly applicable to sulfuric acid solutions contaminated with nitrogen-oxygen compound impurities wherein the $H_2SO_4$ concentration is in the range of about 70% to about 100%. However, any sulfuric acid solution so contaminated, and particularly those contaminated solutions having an $H_2SO_4$ concentration of at least 60% are improved in quality in accordance with the process of this invention.

While this invention has been described with respect to certain embodiments it is to be understood that it is not so limited and that variations and modifications thereof obvious to those skilled in the art may be made without departing from the spirit or scope of this invention.

What is claimed is:

1. The method of improving the quality of sulfuric acid containing nitrogen-oxygen compound impurities and having an $H_2SO_4$ content of not less than 60% which comprises the steps of (1) determining the amount of said impurities in said acid and (2) thereafter passing acetylene in an amount of from 2 to 500 parts by weight thereof for each part by weight of said impurities in said acid, below the surface of said acid, which is at a temperature of 20° C. to 125° C., for a period of time only sufficient for the acetylene to react with and remove said impurities, the amount of acetylene employed within the said range of 2 to 500 parts by weight being higher at the lower temperatures of said acid and lower at the higher temperatures of said acid.

2. The method of improving the quality of sulfuric acid containing nitrogen-oxygen compound impurities selected from the group consisting of nitric acid and nitrosyl sulfuric acid and mixtures thereof and having an $H_2SO_4$ content of from about 70% to about 100% which comprises the steps of (1) determining the amount of said acid impurities present in said acid and (2) thereafter passing acetylene, in an amount of from 2 to 500 parts by weight thereof for each part by weight of said impurities in said acid, below the surface of said acid, which is at a temperature of 20° C. to 125° C., for a period of time only sufficient for the acetylene to react with and remove said impurities, the amount of acetylene employed within the said range of 2 to 500 parts by weight being higher at the lower temperatures of said acid and lower at the higher temperatures of said acid.

References Cited in the file of this patent

UNITED STATES PATENTS 2,198,686     Watson                Apr. 30, 1940

OTHER REFERENCES

Bakers Chem. Co. Cat. No. 54, pp. 213–214 (Apr. 1954), J. T. Baker Chem. Co., Phillipsburg, N.J.

Mellor: "Comprehensive Treatise on Inorganic and Theoretical Chemistry," vol. 10, page 438, lines 13 and 14 from bottom.